United States Patent
Smoke et al.

(10) Patent No.: US 12,442,316 B1
(45) Date of Patent: Oct. 14, 2025

(54) SHROUD SYSTEM WITH TWO-STAGE SPRING AND RETAINER SYSTEM FOR GAS TURBINE ENGINE SHROUD

(71) Applicant: HONEYWELL INTERNATIONAL INC., Charlotte, NC (US)

(72) Inventors: Jason Smoke, Phoenix, AZ (US); Timothy Darling, Phoenix, AZ (US); Jeffrey Aitchison, Phoenix, AZ (US); William Weiss, Phoenix, AZ (US); Courtney Murphy, Phoenix, AZ (US); Harry Kington, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 19/052,405

(22) Filed: Feb. 13, 2025

(51) Int. Cl.
   *F01D 11/18* (2006.01)
   *F01D 25/24* (2006.01)

(52) U.S. Cl.
   CPC ........ *F01D 25/246* (2013.01); *F05D 2240/14* (2013.01); *F05D 2260/38* (2013.01)

(58) Field of Classification Search
   None
   See application file for complete search history.

(56) References Cited

U.S. PATENT DOCUMENTS

| | | | | |
|---|---|---|---|---|
| 5,018,942 A | * | 5/1991 | Ciokajlo | F01D 11/22 415/173.2 |
| 5,056,988 A | * | 10/1991 | Corsmeier | F01D 11/22 415/173.2 |
| 5,104,287 A | * | 4/1992 | Ciokajlo | F01D 11/22 415/173.2 |
| 5,228,828 A | * | 7/1993 | Damlis | F01D 11/22 415/173.2 |
| 6,733,233 B2 | | 5/2004 | Jasklowski et al. | |
| 7,596,954 B2 | * | 10/2009 | Penda | F01D 11/22 415/173.2 |
| 7,686,569 B2 | * | 3/2010 | Paprotna | F01D 11/22 415/128 |
| 8,393,858 B2 | | 3/2013 | Smoke et al. | |
| 10,053,999 B2 | | 8/2018 | McCaffrey et al. | |
| 10,392,957 B2 | | 8/2019 | Crutchfield | |

(Continued)

FOREIGN PATENT DOCUMENTS

JP      H1077803 A      3/1998

OTHER PUBLICATIONS

Kai, Peng, et al., "Active generalized predictive control of turbine tip clearance for aero-engines," Chinese Journal of Aeronautics, Aug. 1, 2013.

*Primary Examiner* — Kayla Mccaffrey
(74) *Attorney, Agent, or Firm* — Ingrassia, Fisher & Lorenz | IFL

(57) ABSTRACT

A shroud system for a gas turbine engine. The shroud system includes a support structure defining two stages. One shroud is disposed at one stage and another shroud is disposed at the other stage. A retention and positioning assembly is disposed on the support structure and positions and holds both shrouds relative to the support structure. A load transfer pin is located radially outward from each of the shrouds. A spring is coupled to the support structure and engages both load transfer pins. The spring applies forces on the load transfer pins toward their respective shroud. A retainer is coupled with the support structure and extends over both stages.

20 Claims, 7 Drawing Sheets

(56) References Cited

U.S. PATENT DOCUMENTS

| | | | |
|---|---|---|---|
| 11,015,484 B2 | 5/2021 | Lepretre et al. | |
| 11,208,896 B1 | 12/2021 | Baucco et al. | |
| 11,686,274 B2 | 6/2023 | McCaffrey et al. | |
| 12,091,980 B1 | 9/2024 | Smoke et al. | |

\* cited by examiner ns with or around the shroud, including during the operation of the gas turbine engine. Furthermore, other desirable features and characteristics of the present disclosure will become apparent from the subsequent detailed description and the appended claims, taken in conjunction with the accompanying drawings and the foregoing technical field and background.

SHROUD SYSTEM WITH TWO-STAGE SPRING AND RETAINER SYSTEM FOR GAS TURBINE ENGINE SHROUD

TECHNICAL FIELD

The present disclosure generally relates to rotating machinery, and more particularly relates to a shroud system with a spring and retainer system for positioning and accommodating relative movement between a shroud and a support case for applications such as a gas turbine engine.

BACKGROUND

A gas turbine engine's efficiency is, at least in-part, defined by blade tip clearance. Maintaining a desired tip clearance throughout the entire range of engine operating conditions (the engine cycle) is challenging. Accordingly, compressor and/or turbine rotor blade stages in gas turbine engines may be provided with shrouds designed to achieve a desired level of engine performance. In certain applications, the shrouds may react to thermal excursions by expanding or growing radially at a different rate than surrounding components. In addition, the components coupling the shroud within the gas turbine engine may thermally expand or grow radially at a different rate than the shroud, which may cause these components to move radially relative to the shroud. The movement of these components relative to the shroud may result in wear on the shroud, positioning challenges and may impact life of the shroud. Tight control of the location of a shroud relative to its supporting structure is preferred. Such control is made more challenging when the material from which a shroud is made has a significantly different coefficient of thermal expansion (CTE) as compared to the material of the surrounding components.

Accordingly, it is desirable to provide a system for coupling a shroud within a gas turbine engine, which accommodates relative radial movement of the components that couple with, or that surround the shroud, including during the operation of the gas turbine engine. Furthermore, other desirable features and characteristics of the present disclosure will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In a number of embodiments, a shroud system is provided. The shroud system includes a support structure defining two stages. One shroud is disposed at one stage and another shroud is disposed at the other stage. A retention and positioning assembly is disposed on the support structure and positions and holds both shrouds relative to the support structure. A load transfer pin is located radially outward from each of the shrouds. A spring is coupled to the support structure and engages both load transfer pins. The spring applies forces on the load transfer pins toward their respective shroud.

In additional embodiments, a shroud system includes a support structure configured in an annular shape and defining a pair of axially separated spaces. A retention and positioning assembly is disposed on the support structure to position the shrouds relative to the support structure and to hold shrouds concentric with the support structure, while allowing relative radial movement between the shrouds and the support structure. A load transfer pin is disposed radially outward from one shroud and another load transfer pin included is disposed radially outward from the other shroud. A spring is coupled to the support structure and engages both load transfer pins. The spring applies forces on the load transfer pins directed toward their respective shroud. The forces maintain continuous contact between each of the shrouds and the retention and positioning assembly.

In other embodiments, a shroud system for a gas turbine engine includes a support structure configured in an annular shape and defining a pair of axially spaced stages. A shroud is disposed at one stage and surrounds a set of blades of the gas turbine engine. Another shroud is disposed at another stage and surrounds another set of blades of the gas turbine engine. A retention and positioning assembly is disposed on the support structure and positions and holds the shrouds relative to the support structure. A pair of load transfer pins are included, with one load transfer pin disposed radially outward from each of the shrouds. A spring is coupled to the support structure and engages both the load transfer pins. The spring applies a first force on one load transfer pin that is directed toward its respective shroud, and applies a second force on the other load transfer pin directed toward its respective shroud. A retainer is coupled with the support structure and has one end disposed radially outward from one shroud and adjacent that shroud's respective load transfer pin. The retainer has a second end disposed radially outward from the other shroud and adjacent that shroud's respective load transfer pin.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
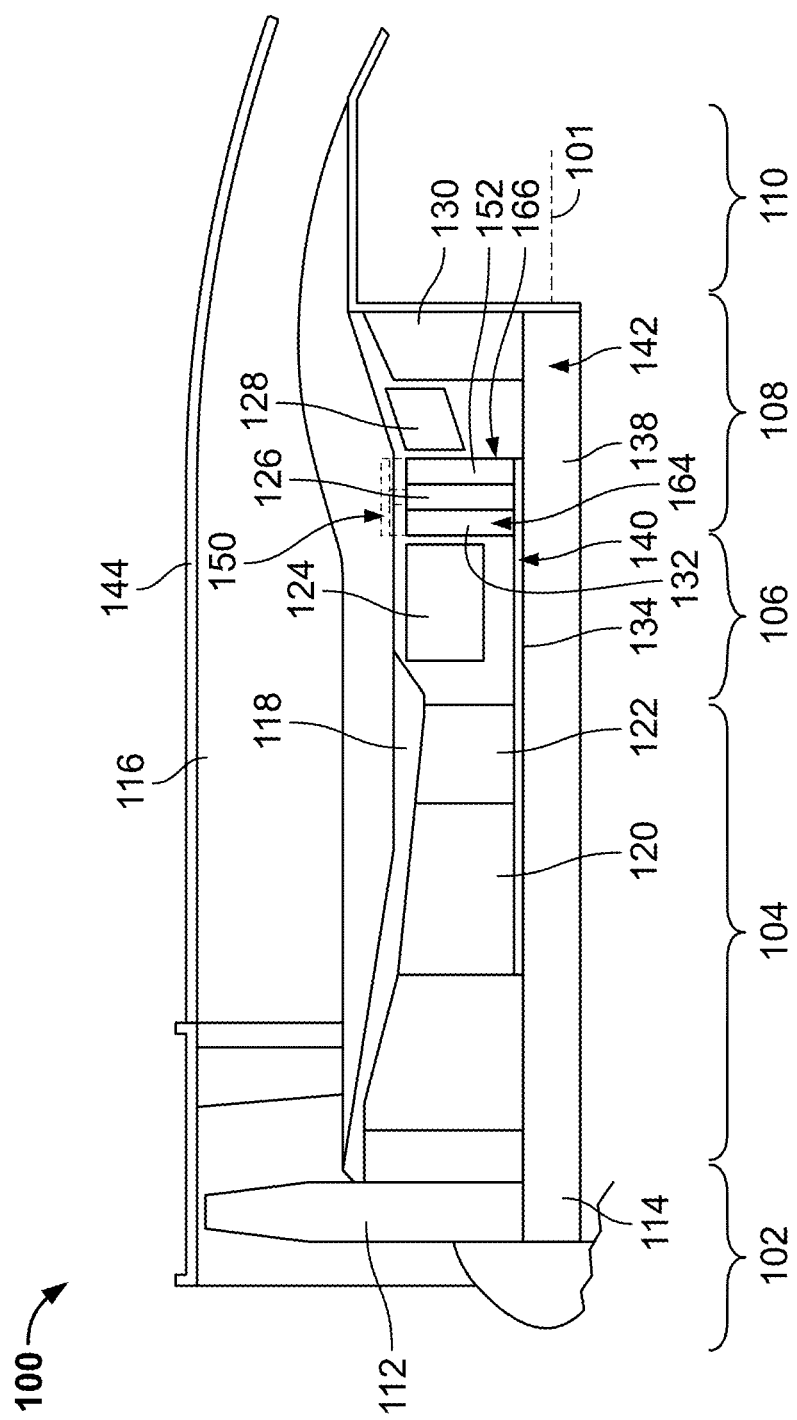
FIG. 1 is a schematic cross-sectional illustration of a half of a gas turbine engine, which includes an exemplary shroud system in accordance with a number of embodiments.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of arrangement that would benefit from a spring biased retention system and the use of the spring biased retention system for coupling a shroud to a case associated with a gas turbine engine described herein is merely one exemplary embodiment according to the present disclosure. In addition, while the spring biased retention system is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

With reference to FIG. 1, a partial (upper half as viewed), cross-sectional view of an exemplary gas turbine engine 100 is shown with the remaining portion of the gas turbine engine 100 being substantially axisymmetric about a longitudinal axis 101. The longitudinal axis 101 comprises an axis of rotation for the rotors of the gas turbine engine 100. In the depicted embodiment, the gas turbine engine 100 is an annular multi-spool, turbofan gas turbine jet engine for use with an aircraft (not shown), although other arrangements and uses are included within the scope of this disclosure. As will be discussed further herein, this disclosure includes a shroud system 150 that includes a spring and retainer system for interfacing a shroud to a support structure/support case, such as of the gas turbine engine 100. The disclosure is not limited to a gas turbine engine but may be applicable to other applications where locating and relative movement of a shroud and structure is desirable, for example in turbines, compressors, and other rotating machinery. In this example, the shroud system 150 is circumferentially disposed about two stages of a high pressure turbine 126. In other embodiments, the shroud system 150 may be employed wherever two shrouds are arranged axially in-series.

In the example of FIG. 1, the application's rotating machinery is the gas turbine engine 100, which is configured as a two-spool engine. It will be appreciated that in other embodiments, a different number of spools with different compressor/turbine arrangements may be employed. The gas turbine engine 100 includes a fan section 102, a compressor section 104, a combustor section 106, a turbine section 108, and an exhaust section 110. The fan section 102 includes a fan 112 mounted on a rotor 114 that draws air into the gas turbine engine 100 and accelerates it. A fraction of the accelerated air exhausted from the fan 112 is directed through an outer bypass duct 116 and the remaining fraction of air exiting from the fan 112 is directed into the compressor section 104. The outer bypass duct 116 is generally defined between an inner bypass duct 118 and an outer casing 144.

The gas turbine engine 100 in the embodiment of FIG. 1 includes a high pressure spool 140 that includes the high-pressure turbine 126, an axial compressor 120, a centrifugal compressor 122 and a shaft 134, which ties the components together in an assembly. As such, the high pressure turbine 126 drives the axial compressor 120 and the centrifugal compressor 122. In other embodiments, the number of compressors and the type of compressors in the compressor section 104 may vary. In the depicted embodiment the axial compressor 120 and the centrifugal compressor 122 sequentially raise the pressure of the air and direct a majority of the high-pressure air into the combustor section 106. A fraction of the compressed air bypasses the combustor section 106 and is used to cool, among other components, blades 132, 152 in the turbine section 108. In this embodiment of the gas turbine engine 100, the high pressure turbine 126 includes at least two stages (upstream stage 164 and downstream stage 166) with two sets of blades 132 and 152 arranged in axial series. The blades 132 may have a different diameter at their tips as compared to the blades 152.

A low pressure spool 142 includes a low pressure turbine 130, the fan 112 and a shaft 138. The low pressure turbine 130 may include any number of axial stages appropriate for the application. The shaft 134 is a hollow shaft or shaft-like structure (at least in-part a hollow cylinder or cylindrical shaft), and the shaft 138 extends through the shaft 134. In other embodiments, other components may be coupled in the low pressure spool 142. In additional embodiments, a different arrangement may be employed. For example, the compressor section 104 may include a low pressure compressor and a high pressure compressor. In such an embodiment, the high pressure spool 140 may include the high pressure compressor and the low pressure spool may include the low pressure compressor. In still other embodiments, the shaft 134 may be assembled with other rotating components, such as in a pump or other rotating machinery type pieces of equipment with a different number of spools.

In the combustor section 106, which includes a combustion chamber 124, the high-pressure air is mixed with fuel, which is combusted. The high-temperature combustion air is directed into the turbine section 108. In this example, the turbine section 108 includes the two turbines disposed in axial flow series, namely, the high-pressure turbine 126, and a low-pressure turbine 130. However, it will be appreciated that the number of turbines, and/or the configurations thereof, may vary by application. In this embodiment, the high-temperature air from the combustor section 106 expands through and rotates each turbine 126 and 130. As the turbines 126 and 130 rotate, each drives equipment in the gas turbine engine 100 via the concentrically disposed shafts in their respective spools 140, 142.

Figure 2:
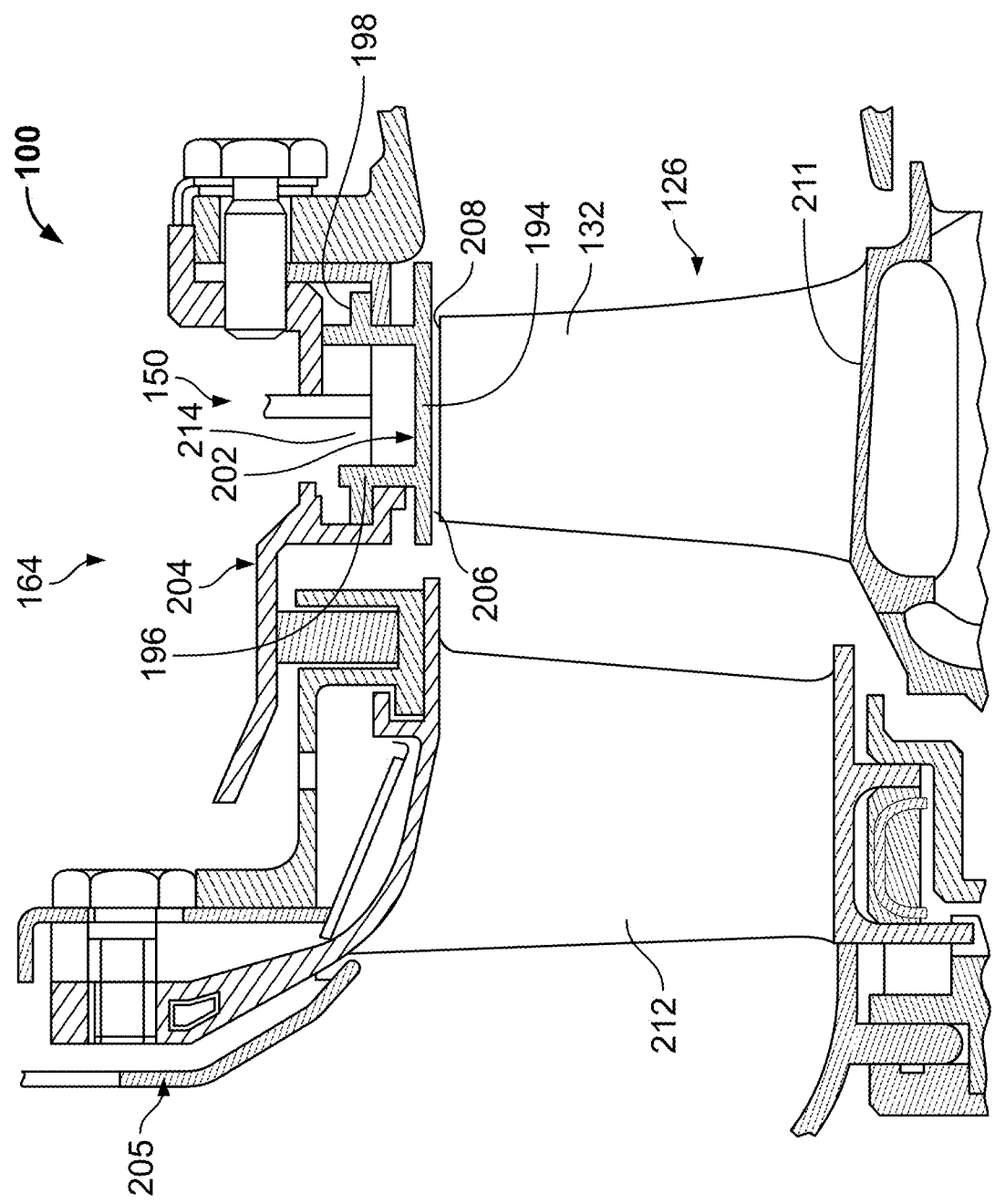
FIG. 2 is a schematic, sectional view of a part of the gas turbine engine of FIG. 1, in accordance with a number of embodiments.

Referring to FIG. 2 along with FIG. 1, a part of the gas turbine engine 100 is schematically illustrated. In this example, the shroud system 150 includes a shroud 202 that is circumferentially disposed about the blades 132 of the upstream stage 164 of the high pressure turbine 126. It should be understood that another shroud (discussed below) will be disposed about the blades 152 of the downstream stage 166 (FIG. 1).

A support structure 204 is coupled to a portion of a case 205 associated with the core of the gas turbine engine 100. The support structure 204 may also be referred to as a support case. The support structure 204 defines an annular body with a recess or space that is referred to as a groove 214. The groove 214 is annular and opens radially inward presenting a space for the shroud 202. In other embodiments, the space may have a different configuration that isn't groove shaped. The shroud system 150 includes features that position the shroud 202 relative to the support structure 204, generally within or at the groove 214. The shroud 202 includes rails 196 and 198 that extend radially outward from an annular ring 194 and into the groove 214. The case 205, which may also be associated with the combustor section 106, in turn, may be coupled to other structure of the gas turbine engine. It should be noted that the placement of the shroud 202 and the support structure 204 about the blades 132 of the high pressure turbine 126 is merely exemplary, as the shroud 202, the support structure 204 and the shroud system 150 may be employed with any turbine in the turbine section 108 or compressor in the compressor section 104, or in other applications in other rotating machinery.

The shroud 202 is disposed concentric with the support structure 204 and also with the blades 132 to optimize aerodynamic efficiency. A radial gap (i.e., blade tip clearance) 206 is defined between the shroud 202 and an outermost diameter (tip 208) of the blades 132. The radial gap of the blade tip clearance 206 is very small, for example, in a range of about 0.25 millimeter (mm) to about 0.50 mm. In other embodiments, the blade tip clearance 206 may be larger or smaller than this range. The blades 132 are mounted in a stack 211 assembled in the high pressure spool 140. The blades 132 may be arranged in multiple axially spaced sets, such as in circumferential rows/assemblies with the blades 152. In this case, the blades 132 are preceded by a set of stator vanes 212 that are fixed to the case 205.

Minimizing blade tip clearance 206 is advantageous for turbine efficiency and overall engine efficiency is turbine efficiency. The shroud 202 may be made of a material that differs from that of the support structure (support case) 204. For example, the support structure 204 may be metal, for example a nickel-chrome-iron alloy. The shroud 202 may be a monolithic, full-ring ceramic part, such as silicon nitride, that offers advantages over other options such as a segmented metallic design because it may withstand higher turbine inlet gas temperatures and it presents fewer leak paths through which air flow may enter the main gas path. Additionally, the low CTE of ceramic, allows for smaller blade tip clearance 206. To maintain a suitably small blade tip clearance 206, the location of the shroud 202 relative to the support structure 204 is tightly controlled throughout the entire range of engine operating conditions (engine cycle). Challenges in providing tight control due to the relatively low CTE of the ceramic shroud 202 versus the CTE of the surrounding metal components are overcome through the shroud system 150. In other embodiments, the shroud 202 may be a ceramic-metal-composite (CMC), silicon carbide, or any other material with a different (e.g. lower) CTE than the support structure 204

Figure 3:
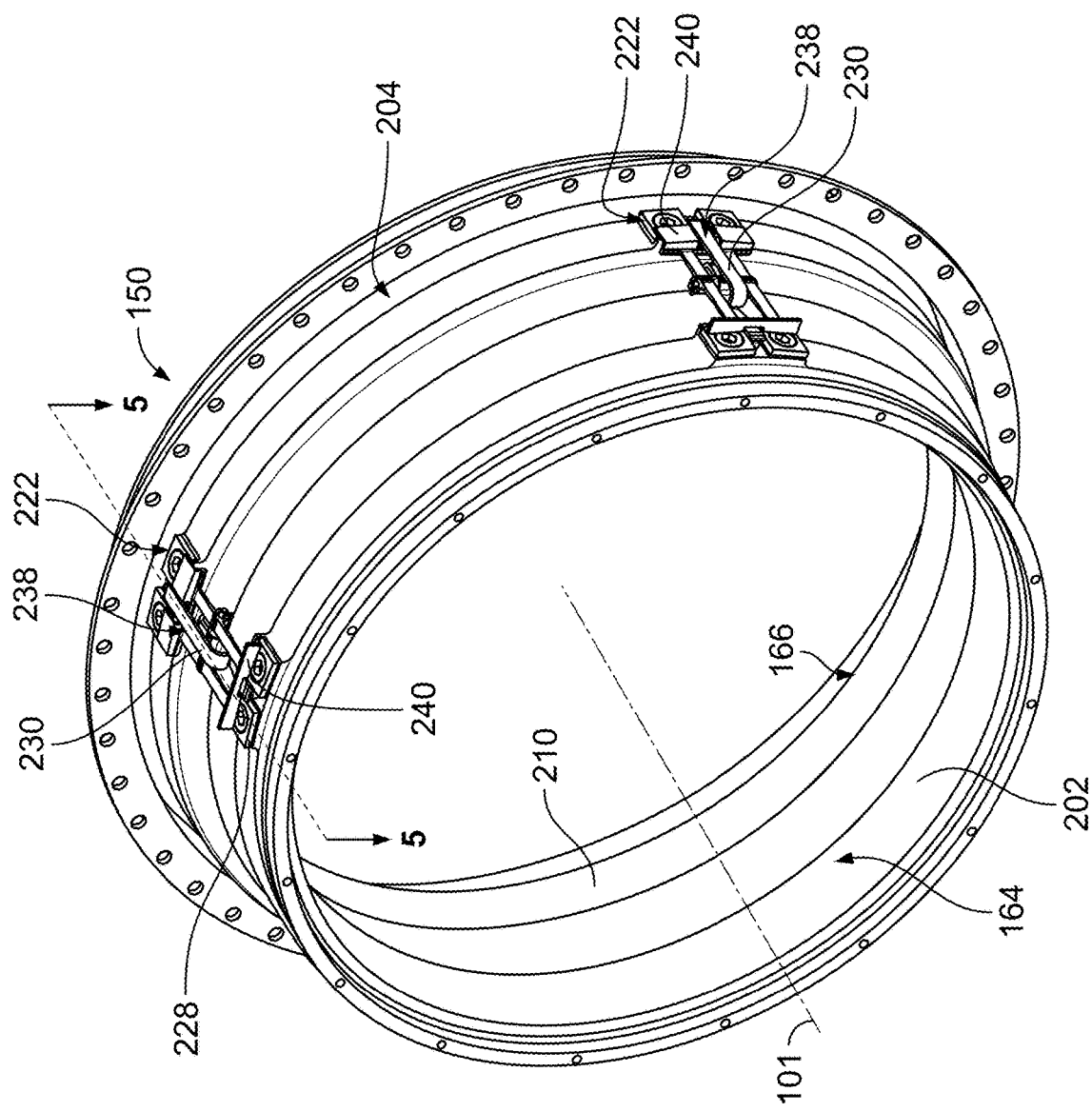
FIG. 3 is a perspective view of at least part of the shroud system isolated from the gas turbine engine of FIG. 1, coupling a shroud to a support structure/case in accordance with a number of embodiments.

Referring additionally to FIG. 3, the shroud system 150 is shown isolated from the gas turbine engine 100. The support structure 204 is configured as a ring shaped structure to extend completely around the longitudinal axis 101. The shroud 202 of the upstream stage 164 of the high pressure turbine 126 and the shroud 210 of the downstream stage 166 are positioned in relation to the support structure 204. The shrouds have different sizes/diameters to accommodate the blades 132, 152. The shroud system 150 includes a number of retention and positioning assemblies 222 distributed around the circumference of the shrouds 202, 210 and the support structure 204. In the current embodiment there are four retention and positioning assemblies 222 (two of which are visible in FIG. 3), each of the four at locations that are disposed 90 degrees from one another. For example, there is a retention and positioning assembly 222 at each of the 12 o'clock, 3 o'clock, 6 o'clock and 9 o'clock locations. The shroud system 150 includes the support structure 204, the shrouds 202 and 210, a spring and retainer system 238 and several interconnected components at each retention and positioning assembly 222.

Figure 5:
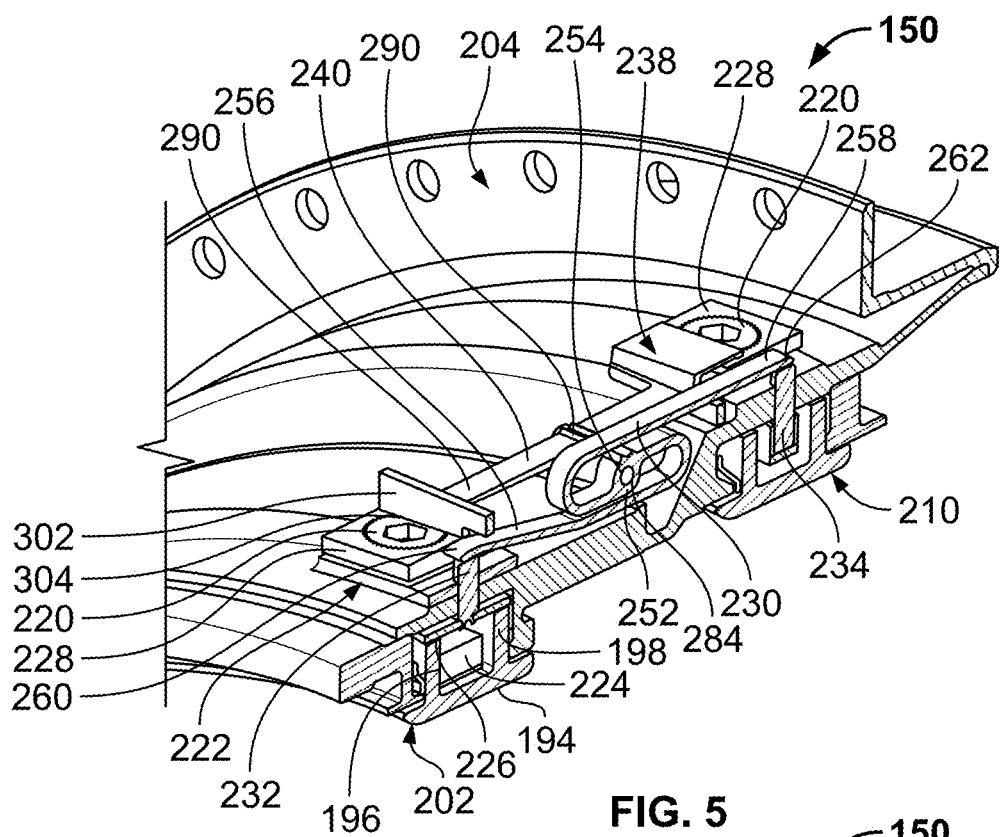
FIG. 5 is a perspective, sectioned view of the spring and retainer system of FIGS. 3-4 taken generally along line 5-5 of FIG. 3, in accordance with a number of embodiments.
Figure 6:
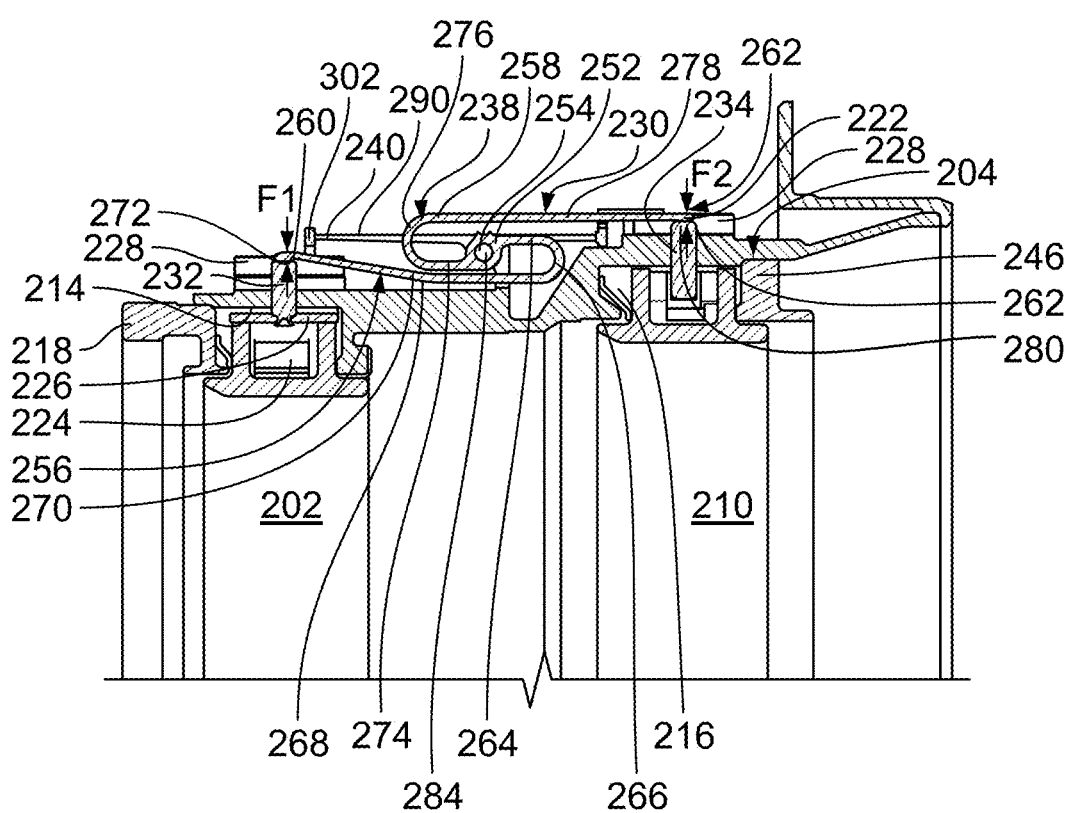
FIG. 6 is a sectional view of the spring and retainer system of at the same section as FIG. 5, in accordance with a number of embodiments.
Figure 7:
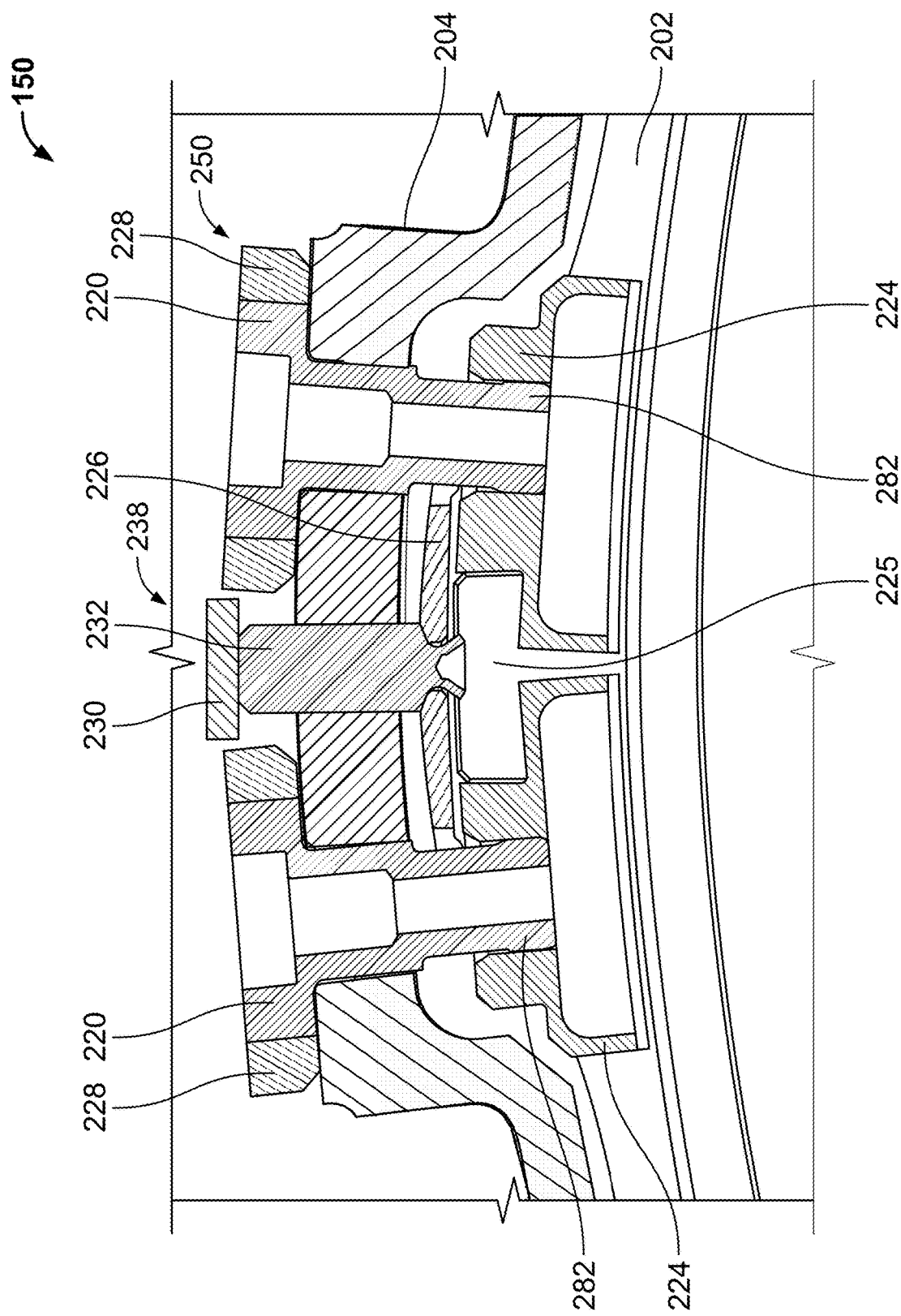
FIG. 7 is a fragmentary, sectional view of at least part of the shroud system of FIGS. 3-6 taken generally through the line 7-7 in FIG. 4, in accordance with a number of embodiments.

In various embodiments and with additional reference to FIGS. 4, 5, 6 and 7, the aforementioned interconnected components include locating pins 220 that extend through holes in the support structure 204 (FIG. 7). The locating pins 220 engage the shroud(s) 202, 210, such as through load spreaders 224 (FIGS. 5 and 7) and radial tabs 225 (FIG. 7) formed on the radially outer surface of the shroud(s) 202, 210. The locating pins 220 have eccentric ends 282 disposed in the load spreaders 224 (FIG. 7). Rotating the locating pins 220 in concert allows for the manufacturing tolerances of all the parts in the system to be compensated for (zeroed out) to locate the shrouds 202, 210. For example, the two locating pins 220 at a retention and positioning assembly 222 of a stage 164, 166 are rotated at the same time. The location (concentricity) of the shroud(s) 202, 210 may be set at a design position relative to the support structure 204. The load spreaders 224 may be employed to reduce/minimize concentrated loads on surfaces of the shroud 202. The locating pins 220 and the load spreaders 224 may be used to set the location of the shrouds 202 and 210 including in the up-down and left-right directions (directions perpendicular to the axis 101). Once the locating pins 220 are dialed in to the desired orientation, a lock ring 228 is placed on each locating pin 220 with interlocking features such as ridges to prevent rotation of the locating pins 220 after being set.

Spring elements and/or load transfer elements such as load springs 230 are included in the spring and retainer system 238. Load transfer pins 232 and 234 may be used at each of the retention and positioning assemblies 222 and may be a part of the spring and retainer system 238. In this embodiment, the load transfer pin(s) 232 is/are disposed around the shroud 202 and the load transfer pin(s) 234 is/are disposed around the shroud 210. The load transfer pins 232 and 234 extend radially and operate to transfer force from the load springs 230 to maintain the load spreaders 224 in seated positions against the respective shroud 202, 210. The load transfer pins 232, 234 may engage the load spreaders 224 through transfer plates 226 (FIGS. 5-7) so that one load transfer pin(s) 232, 234 transfer force of the load spring 230 to two load spreaders 224 (one on each side of each tab 225) at each stage 164, 166. Each load spring 230 spans between the upstream stage 164 and the downstream stage 166 applying force to both the load transfer pin(s) 232 and the load transfer pin(s) 234. The load springs 230 and the load transfer pins 232, 234 generate and transmit a radially inward load on the load spreaders 224 (through the transfer plates 226) to ensure that they are maintained in contact with their respective shroud 202, 210 throughout the engine operating cycle.

A retainer 240 is employed at each of the retention and positioning assemblies 222 and may be a part of the spring and retainer system 238. The retainers 240 ensure that the locating pins 220 and their accompanying lock rings 228 are not able to become disengaged during engine operation, holding them in place. This ensures that the lock rings 228 remain elements that serve to prevent rotation of the locating pins 220 once they have been adjusted. The current disclosure is applicable to a system with multiple stages and includes load springs 230 and retainers 240 configured for a two-stage system. The benefit of maintaining an inward radial load on the load spreaders 224 at two stages is provided, as well as retaining lock rings 228 and locating pins 220 for two stages using only a single lightweight, compact load spring 230 and a single lightweight, compact retainer 240 at each set of load transfer pins 232, 234 in each retention and positioning assembly 222.

As shown in FIG. 7, an exemplary component set referred to as a positioning set 250 of the shroud system 150 is illustrated. The components of each positioning set 250 may include the locating pins 220 (with eccentric ends 282), the load spreaders 224, the tabs 225, the load transfer pins 232, the lock rings 228, the transfer plate 226, and part of the support structure (support case) 204 in exploded view. The eccentric ends 282 may be offset, lobed or cam-like relative to the remainder of the locating pin 220. There are two positioning sets 250 at each retention and positioning assembly 222, one at the shroud 202 and another at the shroud 210. In the embodiment of FIG. 3, with four retention and positioning assemblies 222 there will be eight positioning sets 250. The configuration and operation of the locating pins 220, the load spreaders 224, the tabs 225, the load transfer pins 232, 234, the lock rings 228, the transfer plates 226, and other system components, which may be employed in, or along with, the shroud system 150 and the embodiments described herein, may be as described in U.S. Pat. No. 12,091,980, which issued Sep. 17, 2024, is entitled Spring Biased Shroud Retention System for Gas Turbine Engine, and which is commonly assigned and is specifically incorporated herein by reference.

Figure 4:
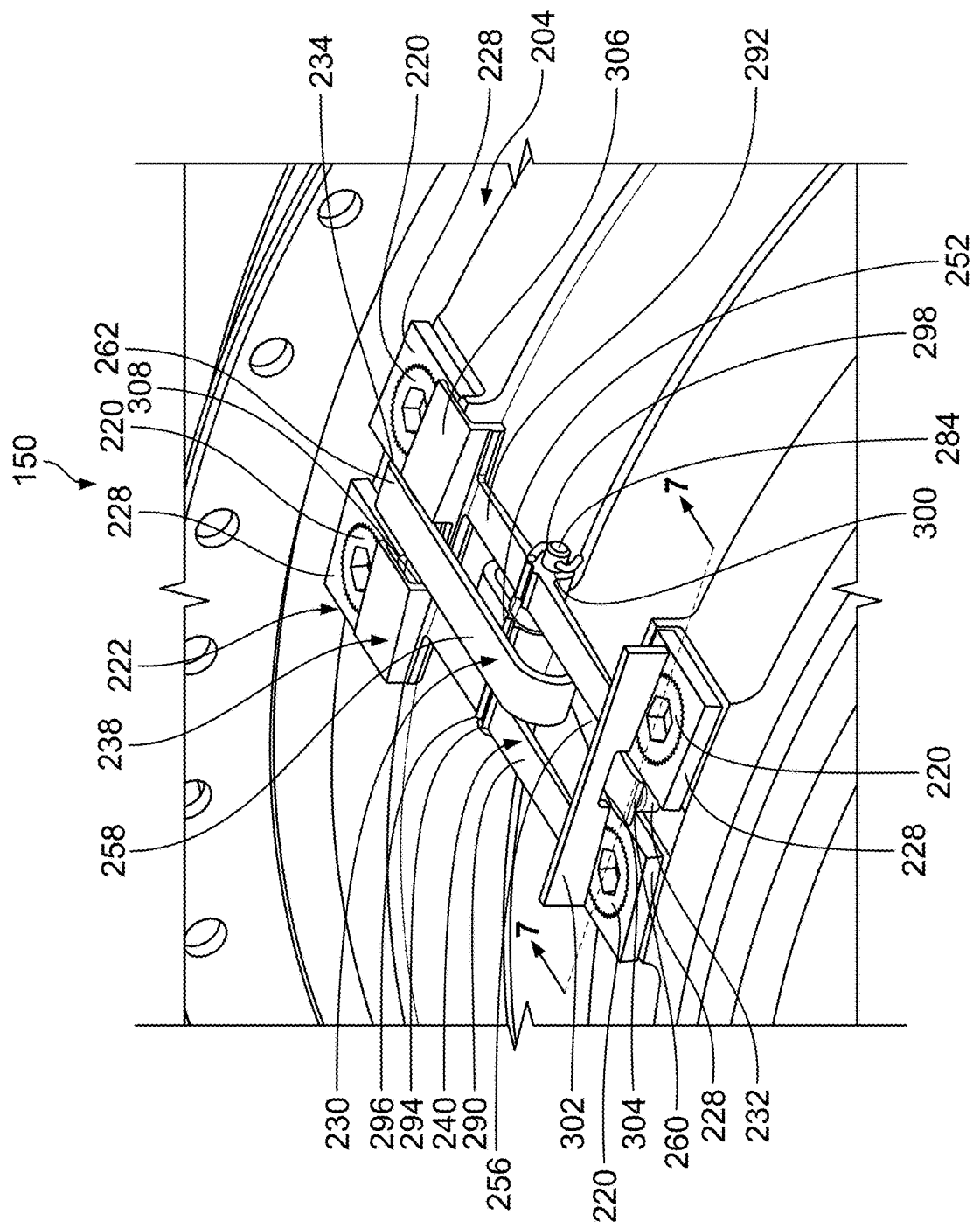
FIG. 4 is a fragmentary, perspective, detail view of part of the shroud system of FIG. 3 showing a spring and retainer system, in accordance with a number of embodiments.

Referring collectively to FIGS. 4, 5 and 6, each load spring 230 includes a central body 252 through which an opening 254 extends. A pair of spring arms 256 and 258 extend from the central body 252. The spring arm 256 includes an end 260 that engages and applies a radially inward directed force F1 (FIG. 6) to the load transfer pin 232. The spring arm 258 includes an end 262 that engages and applies a radially inward directed force F2 (FIG. 6) to the load transfer pin 234.

As best shown in FIG. 6, the spring arm 256 initially extends from the central body 252 in a downstream direction away from the load transfer pin 232 via a segment 264. A segment 266 extends from the segment 264 and bends through approximately 180 degrees, turns radially inward, and is U-shaped. The segment 266 redirects the spring arm 256 toward the load transfer pin 232. A segment 268 extends from the segment 266 to the end 260. The segment 268 includes a bend 270 that directs the spring arm 256 radially outward onto the end 272 of the load transfer pin 232 applying the radially inward force F1 thereto.

Also as best shown in FIG. 6, the spring arm 258 initially extends from the central body 252 in an upstream direction away from the load transfer pin 234 via a segment 274. A segment 276 extends from the segment 274 and bends through approximately 180 degrees, turns radially outward, and is U-shaped. The segment 276 redirects the spring arm 258 toward the load transfer pin 234. A segment 278 extends from the segment 276 to the end 262. The segment 278 directs the spring arm 258 onto the end 280 of the load transfer pin 234 applying the radially inward force F2 thereto. The load spring 230 is fixed to the support structure 204 by a support pin 284 that extends through the opening 254. The foregoing description of the load spring 230 is applicable to the load spring 230 at each of the retention and positioning assemblies 222.

As best shown in FIG. 4, the retainer 240 includes a beam 290 that extends in the axial direction and is located on one side of the load spring 230 and includes another beam 292 that extends in the axial direction and is located another side of the load spring 230. The load spring 230 extends in a location between the beams 290, 292 and generally parallel thereto. The beam 290 includes a central body 294 with an opening 296 extending therethrough and the beam 292 includes a central body 298 (FIG. 4) with an opening 300 extending therethrough. The support pin 284 extends through central bodies 294, 298 such as at the openings 296 and 300 holding the retainer 240 in position relative to the support structure 204.

A bar 302 is connected with both of the beams 290, 292 of the retainer 240 at their ends adjacent the load transfer pin 232. The bar 302 has a rectangular cross section and has a cavity 304 providing clearance for the segment 268 of the spring arm 256. In other embodiments, the bar 302 may have any cross section shape. The segment 268 passes radially inward from the bar 302. The bar 302 is positioned against the lock rings 228 and the locating pins 220 at the upstream stage 164. The bar 302 holds the lock rings 228 and the locating pins 220 in position so that the set position provided thereby is maintained.

A bar 306 is connected with both of the beams 290, 292 of the retainer 240 at their ends adjacent the load transfer pin 234 (opposite ends from the bar 302). The bar 306 has an angular cross section and has a cavity 308 providing clearance for the segment 268 of the spring arm 258. In other embodiments, the bar 306 may have any cross section shape. The segment 278 passes radially outside the bar 306. The bar 306 is positioned against the lock rings 228 and the locating pins 220 at the downstream stage 166, engaging the lock rings 228 on two sides. The bar 306 holds the lock rings 228 and the locating pins 220 in position so that their dialed in positions are maintained.

As shown in FIG. 6, the shroud 202 is generally disposed in the space (groove 214) of the support structure 204. A ring 218 engages the support structure 204 and captures the shroud 202 in the groove 214. The shroud 210 is generally disposed in the space (groove 216) of the support structure 204. A ring 246 engages the support structure 204 and captures the shroud 210 in the groove 216. The grooves 214 and 216 may be configured as annular cavities or other shaped space areas for securing the shrouds 202, 210 at their respective position in the upstream stage 164 and the downstream stage 166.

Figure 8:
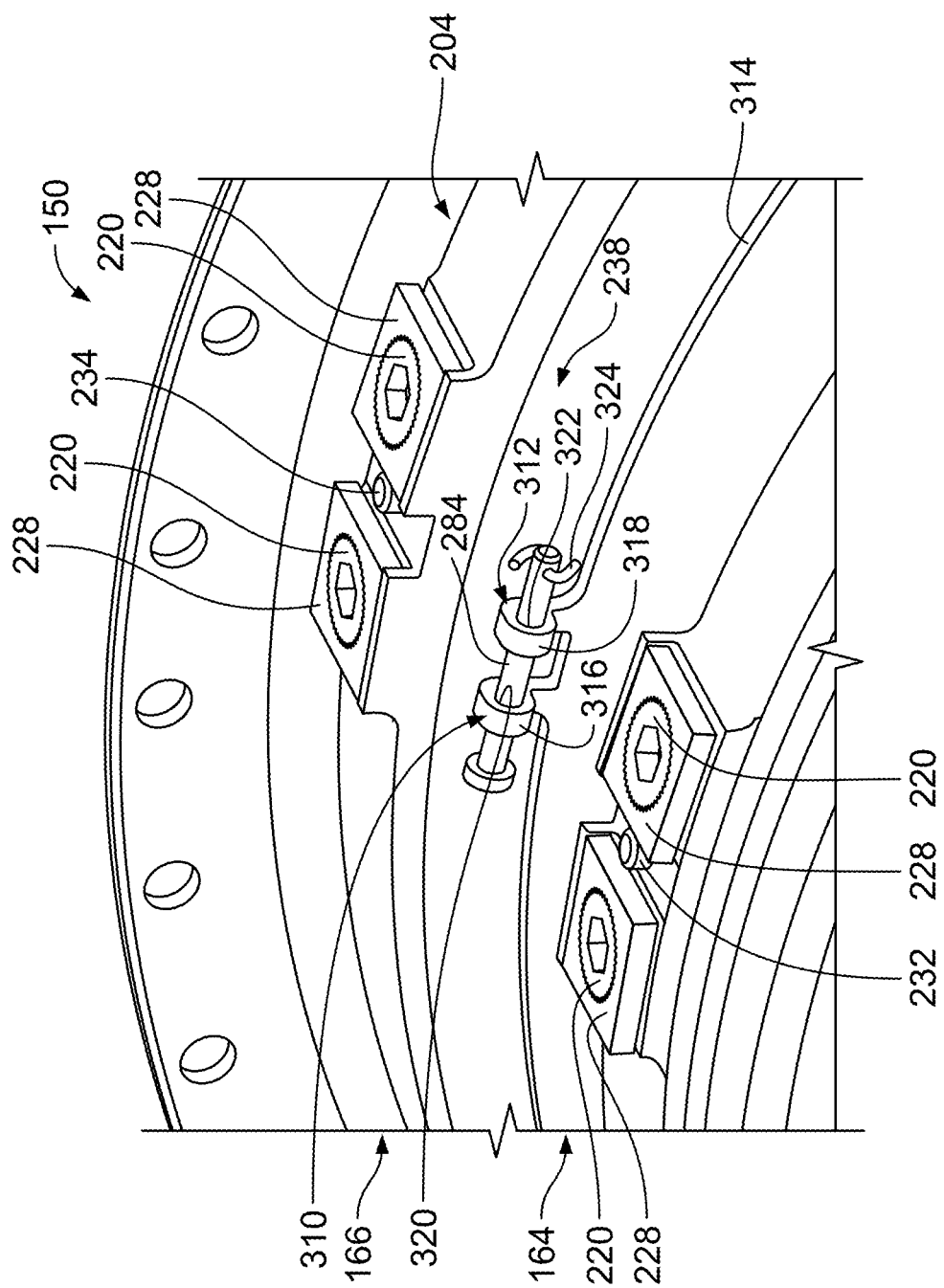
FIG. 8 is a is a perspective, detail view of parts of the spring and retainer system of FIGS. 3-7 with the retainer and the spring omitted for visibility, in accordance with a number of embodiments.

Referring to FIG. 8, the area of the support pin 284 is illustrated with the retainer 240 and the load spring 230 removed for visibility. The support structure 204 includes a pair of arms 310, 312, in this example extending radially outward from a flange 314 that is disposed between the stages 164 and 166 in the axial direction. The flange 314 extends circumferentially around the support structure 204. The arms 310 and 312 may form a type of clevis or other structure to hold the support pin 284 in position relative to the support structure 204. Each arm 310, 312 has a respective clevis barrel 316, 318 that present respective openings 320, 322. The openings 320 and 322 are oriented to extend through the arms 310, 312 in a tangential direction (relative to the axis 101 and the support structure 204) and are in-line with one another. The support pin 284 extends through the openings 320 and 322 and through the load spring 230 and the retainer 240 (FIG. 4). The support pin 284 is held in place by a pin 324, which in other embodiments may be another type of fastener/retainer such as a clip. As such, the load spring 230 and the retainer 240 are held in location relative to the support structure 204. The beams 290, 292 are configured to elastically flex to allow for different radial growth rates between the upstream stage 164 and the downstream stage 166. Similarly, the load spring 230 allows for different radial growth rates between the upstream stage 164 and the downward stage 166. In each case, the load spring 230 and the retainer 240 maintain the positioning set 250 in a secure condition.

In embodiments, the shroud system 150 is associated with two stages of a high pressure turbine 126 of the gas turbine engine 100 (FIG. 1). However, the shroud system 150 may be associated with other stages of the turbine section 108 and/or of a compressor section 104 of the gas turbine engine 100, or with other rotating machinery. The shroud system 150 maintains the axial and circumferential alignment of the shrouds 202, 210 and/or concentricity of the shrouds 202, 210 relative to the support structure (support case) 204, including with differences in thermal growth between the shrouds 202, 210 and the support structure 204. In addition, the shroud system 150 also substantially inhibits radial movement of various components relative to their respective shroud 202, 210 during thermal growth, which reduces wear on the shroud 202, 210.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A shroud system comprising:
a support structure configured in an annular shape and defining a first stage and a second stage, wherein the second stage is axially spaced from the first stage;
a first shroud disposed at the first stage;
a second shroud disposed at the second stage;
a retention and positioning assembly disposed on the support structure and configured to position the first shroud and the second shroud relative to the support structure and configured to hold the first shroud and the second shroud relative to the support structure;
a first load transfer pin included in the retention and positioning assembly and disposed radially outward from the first shroud;
a second load transfer pin included in the retention and positioning assembly and disposed radially outward from the second shroud; and
a spring coupled to the support structure and engaging both the first load transfer pin and the second load transfer pin, the spring configured to apply a first force on the first load transfer pin directed toward the first shroud and to apply a second force on the second load transfer pin directed toward the second shroud.

2. The shroud system of claim 1, comprising a retainer included in the retention and positioning assembly, the retainer coupled with the support structure and having a first end disposed radially outward from the first shroud and adjacent the first load transfer pin, and the retainer having a second end disposed radially outward from the second shroud and adjacent the second load transfer pin.

3. The shroud system of claim 1, wherein the retention and positioning assembly includes a first positioning set that includes at least one load spreader through which the first force is transferred from the first load transfer pin to the first shroud.

4. The shroud system of claim 1, wherein the retention and positioning assembly includes a first positioning set engaged with the first shroud and a second positioning set engaged with the second shroud, wherein the first positioning set is configured to position the first shroud relative to the support structure and the second positioning set is configured to position the second shroud relative to the support structure.

5. The shroud system of claim 1, comprising:
a first positioning set engaged between the spring and the first shroud, wherein the first positioning set is configured to position the first shroud relative to the support structure;
a second positioning set engaged between the spring and the second shroud, wherein the second positioning set is configured to position the second shroud relative to the support structure; and
a retainer included in the retention and positioning assembly, wherein the retainer is coupled with the support structure, the retainer including a first bar disposed at the first end and radially outward from the first shroud, the first bar engaging the first positioning set, and the retainer including a second bar disposed at the second end and radially outward from the second shroud, the second bar engaging the second positioning set.

6. The shroud system of claim 1, wherein the support structure comprises a support case for a turbine.

7. The shroud system of claim 1, comprising a retainer included in the retention and positioning assembly, wherein the retainer is coupled with the support structure, the retainer including:

a first beam disposed on one side of the spring;
a second beam disposed on another side of the spring;
a first bar disposed at the first end and radially outward from the first shroud, the first bar connected with the first beam and with the second beam, the first bar engaging the first positioning set; and
a second bar disposed at the second end and radially outward from the second shroud, the second bar connected with the first beam and the second beam, the second bar engaging the second positioning set.

8. The shroud system of claim 1, wherein the spring includes a central body, a first arm extending from the central body to the first retention pin and a second arm extending from the central body to the second retention pin, wherein the central body is coupled with the support structure between the first and second stages and the arms are configured to flex relative to the support structure.

9. The shroud system of claim 1, comprising a plural number of the retention and positioning assemblies distributed around the support structure that are configured to center both the first shroud and the second shroud relative to the support structure.

10. The shroud system of claim 1, wherein the support structure includes a pair of arms and comprising a support pin extending through each of the pair of arms and through the spring.

11. The shroud system of claim 1, comprising a retainer included in the retention and positioning assembly, wherein the support structure includes a pair of arms and comprising a support pin extending through each of the pair of arms, through the spring, and through the retainer.

12. A shroud system comprising:
a support structure configured in an annular shape and defining a first space and a second space, wherein the second space is axially separated from the first space;
a first shroud disposed at the first space;
a second shroud disposed at the second space;
a retention and positioning assembly disposed on the support structure and configured to position the first shroud and the second shroud relative to the support structure and configured to hold the first shroud and the second shroud concentric with the support structure and configured to allow relative radial movement between the first and second shrouds and the support structure;
a first load transfer pin included in the retention and positioning assembly and disposed radially outward from the first shroud;
a second load transfer pin included in the retention and positioning assembly and disposed radially outward from the second shroud; and
a spring coupled to the support structure and engaging both the first load transfer pin and the second load transfer pin, the spring configured to apply a first force on the first load transfer pin directed toward the first shroud and to apply a second force on the second load transfer pin directed toward the second shroud to maintain continuous contact between each of the first and second shrouds and the retention and positioning assembly.

13. The shroud system of claim 12, comprising a retainer included in the retention and positioning assembly, the retainer coupled with the support structure and having a first bar disposed radially outward from the first shroud and adjacent the first load transfer pin, and the retainer having a second bar disposed radially outward from the second shroud and adjacent the second load transfer pin.

14. The shroud system of claim 12, wherein the retention and positioning assembly includes a first positioning set that includes a load spreader and a transfer plate through which the first force is transferred from the first load transfer pin to the first shroud.

15. The shroud system of claim 12, comprising a retainer included in the retention and positioning assembly, the retainer coupled with the support structure, wherein the retention and positioning assembly includes a first positioning set engaged with the first shroud and a second positioning set engaged with the second shroud, wherein, through the spring and the retainer, the first positioning set is configured to position and hold the first shroud relative to the support structure and the second positioning set is configured to position and hold the second shroud relative to the support structure.

16. The shroud system of claim 12, comprising:
a first positioning set engaged between the spring and the first shroud, wherein the first positioning set is configured to position the first shroud relative to the support structure;
a second positioning set engaged between the spring and the second shroud, wherein the second positioning set is configured to position the second shroud relative to the support structure; and
a retainer included in the retention and positioning assembly, wherein the retainer is coupled with the support structure, the retainer including a first bar disposed radially outward from the first shroud and engaging the first positioning set, and the retainer including a second bar disposed radially outward from the second shroud and engaging the second positioning set.

17. The shroud system of claim 12, wherein the support structure comprises a support case for a turbine, wherein the turbine comprises at least two stages.

18. The shroud system of claim 12, comprising a retainer included in the retention and positioning assembly, wherein the retainer is coupled with the support structure, the retainer including:
a first beam disposed on one side of the spring;
a second beam disposed on another side of the spring;
a first bar disposed radially outward from the first shroud and connected with the first beam and with the second beam, the first bar engaging the first positioning set; and
a second bar disposed radially outward from the second shroud and connected with the first beam and the second beam, the second bar engaging the second positioning set,
wherein the first beam and the second beam are coupled with the support structure.

19. The shroud system of claim 12, wherein the spring includes a central body, a first arm extending from the central body to the first retention pin, and a second arm extending from the central body to the second retention pin, wherein the central body is coupled with the support structure between the first and second spaces and the arms are configured to flex relative to the support structure.

20. A shroud system for a gas turbine engine, the shroud system comprising:
a support structure configured in an annular shape and defining a first stage and a second stage, wherein the second stage is axially spaced from the first stage;
a first shroud disposed at the first stage and configured to surround a first set of blades of the gas turbine engine;

a second shroud disposed at the second stage and configured to surround a second set of blades of the gas turbine engine;

a retention and positioning assembly disposed on the support structure and configured to position the first shroud and the second shroud relative to the support structure and configured to hold the first shroud and the second shroud relative to the support structure;

a first load transfer pin included in the retention and positioning assembly and disposed radially outward from the first shroud;

a second load transfer pin included in the retention and positioning assembly and disposed radially outward from the second shroud;

a spring coupled to the support structure and engaging both the first load transfer pin and the second load transfer pin, the spring configured to apply a first force on the first load transfer pin directed toward the first shroud and to apply a second force on the second load transfer pin directed toward the second shroud; and a retainer included in the retention and positioning assembly, the retainer coupled with the support structure and having a first end disposed radially outward from the first shroud and adjacent the first load transfer pin, and the retainer having a second end disposed radially outward from the second shroud and adjacent the second load transfer pin.

\* \* \* \* \*